Patented Nov. 9, 1948

2,453,225

UNITED STATES PATENT OFFICE 2,453,225

INDIGOID VAT DYESTUFF

Kurt Hoelzle and Eduard Kambli, Basel, Switzerland, assignors to Ciba Limited, Basel, Switzerland, a Swiss firm No Drawing. Application September 20, 1945, Serial No. 617,696. In Switzerland October 13, 1944

1 Claim. (Cl. 260—322)

It is an object of the present invention to provide new and valuable indigoid dyestuffs of the naphthalene series. More particularly the present invention is concerned with new dyestuffs which due to the choice of certain new indigoid components yield shades which are substantially different from those obtained with old components and constitute a valuable addition to the range hitherto known. Still more particularly it is an object of the present invention to provide dyestuffs of good printing properties. Further objects will appear as the specification proceeds.

It has already been proposed to prepare indigoid dyestuffs from components of the naphthalene series containing one halogen in the naphthalene nucleus. Alternatively such dyestuffs have been made by halogenating the dyestuffs. Whereas as a rule halogen enters without difficulty into an indigoid component of the benzene series, provided the reactive 5- and 7-positions thereof are unoccupied, it appears to be impossible to introduce a second halogen atom into an indigoid component of the naphthalene series already containing one halogen atom by halogenating the dyestuff containing the said component. (Cf. Patent 1,712,721.) Since it is known that indigoid dyestuffs containing naphththioindoxyl-components yield leuco compounds which are less soluble than those containing oxythionaphthene components of the benzene series and since the solubility of the leuco compounds is as a rule diminished by substitution with halogen, it has hitherto been regarded as being without interest to direct research towards dyestuffs containing twice halogen-substituted naphththioindoxyl-components.

According to the present invention valuable indigoid vat dyestuffs are obtained by reacting dihalogennaphththioindoxyls or their reactive derivatives with components suitable for the manufacture of indigoid dyestuffs and, if desired, treating the resulting product with halogenating agents.

The dihalogennaphththioindoxyls used as starting materials in the present process may contain the hydroxythiophene ring, for example, in 2:1-, in 2:3- or preferably in 1:2-position of the naphthalene nucleus (the first number indicating as usual the position of the naphthalene nucleus to which the sulfur atom of the hydroxythiophene nucleus is linked). The two halogen atoms may be distributed among the two benzene rings of the naphthalene nucleus, for example, occupy the 4- and 8-positions or the 1- and 6-positions or be present in the same benzene nucleus. Both atoms may be linked, for example, to the α-positions of the naphthalene nucleus. As halogen they may contain fluorine, iodine or, preferably, chlorine or bromine or two different halogen atoms. For example, there can be used 4:8- or 5:8-dibromo-1:2-naphththioindoxyl as well as 4:8- and particularly 5:8-dichloro-2:1- and 1:2-naphththioindoxyl, further 1:6-dihalogen-2:3-naphththioindoxyls, for example, 1:6-dichloro- or 1-bromo-6-chloro-2:3-naphththioindoxyl.

In some instances those products are preferred which contain one halogen atom in a position neighbouring that of the sulfur atom, i. e. a position which on normal numbering of the naphthalene nucleus differs only by one unit from the position of the sulfur atom in the naphthalene nucleus, e. g. 1:2 or 4:5. Furthermore one halogen atom may preferably be located in a position centrally symmetrical to that of the sulfur atom, in this case the difference of the two numbers being 4, e. g. 1:5 or 2:6. Both conditions may be fulfilled at the same time.

These thioindoxyls can be converted in known manner into their reactive derivatives, especially anils, for example, para-dimethylamino-anils, and used in that form for the condensation with indigoid components.

The above described dihalogennaphththioindoxyls and their reactive derivatives are new. They can be obtained in known manner, for example, by starting from the corresponding dihalogenaminonaphththalenes according to the known xanthogenate synthesis or from the sulfonic acid chlorides via the mercaptans.

As indigoid components which are to be condensed with the foregoing dihalogennaphththioindoxyls there can be used, for example, thioindigoid and indole-indigoid components. When using thioindigoid components, one component is preferably used in the form of a reactive derivative, whereas indole-indigoid components may find application, for example, in the form of reactive α-derivatives or as isatins themselves, α- and β-condensations being brought about in known manner.

As examples of indigoid components there are especially named: the para-dimethylaminoanils of thionaphthenequinone, of 4-methyl-6-chlorothionaphthenequinone, of 5-methyl-6-chlorothionaphthenequinone, of 1:2-naphththioisatin, of 1-chloro-2:3-naphththioisatin as well as of 6-ethoxythionaphthenequinone, as well as the corresponding hydroxythionaphthene compounds, the α-chlorides of isatin, of 4-methyl-7-methoxyisatin, of 4-methyl-5-chloro-7-methoxyisatin, of 5:7-dibromoisatin, of 5-bromoisatin, further the 5:7-dibromoisatin, the 6-chloro-7-methylisatin, the 5-bromoisatin, as well as the acenaphthenequinone.

The condensation of the dihalogennaphthioindoxyls or their reactive derivatives with the indigoid components is carried out in known manner in indifferent solvents, such as chlorobenzene and glacial acetic acid, preferably in the heat, the kind of the desired condensation having to be taken into consideration. In many cases the condensation can also advantageously be effected in concentrated sulfuric acid.

Valuable results are particularly obtained by effecting the β-condensation with substituted, for example, disubstituted isatins, and by effecting the α-condensations with isatins or thioindoxyls of the benzene and naphthalene series containing no or only few substituents.

If desired, the resulting dyestuffs can be treated in known manner with halogenating agents, such as bromine or sulfuryl chloride. The treatment is effected, for example, in indifferent solvents or diluents at ordinary or raised temperature.

The dyestuffs obtained by the present process can be used for dyeing and particularly for printing a great variety of materials, for example, animal or mainly vegetable fibers in the manner usual for vat dyestuffs. Among the latter fibers, special reference is made to cotton, linen, artificial silk and staple fiber from regenerated cellulose. It is to be remarked that in spite of the fact that some of the dyestuffs of the present invention yield sparingly soluble leuco compounds and may cause difficulties in normal dyeing, printing with these dyestuffs according to the usual potash printing process can be easily effected.

The dyestuffs can also be converted in known manner into leucoester salts, for example, of sulfuric acid, and used in that form for dyeing and printing by the usual methods employed for this class of dyestuffs. Among other things, the dyestuffs of the present invention also yield very valuable brown, grey, bordeaux red and navy blue dyeings and prints fast to washing, chlorine and light.

The following examples illustrate the invention, the parts being by weight:

*Example 1*

269 parts of 3-hydroxy-6:9-dichloronaphtho-[1.2—b] thiophene (Ring Index No. 1744) formerly called 5:8-dichloro-1:2-naphththioindoxyl and 282 parts of 2-(4'-dimethylamino)-anil of thionaphthenequinone are heated with 5000 parts of glacial acetic acid for several hours in the boiling water-bath. After cooling, the dyestuff of the formula

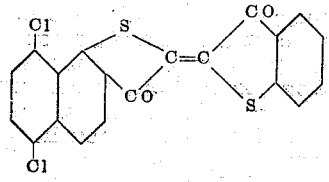

is suction-filtered, washed with alcohol and dried.
It is a violet powder which dissolves in concentrated sulfuric acid with a green coloration and dyes cotton from a brown vat garnet tints having good fastness properties.

The 3-hydroxy-6:9-dichloro-naphtho[1.2—b]-thiophene used in the present example can be prepared as follows:

248 parts of finely powdered hydrochloride of 5:8-dichloro-1-naphthylamine are suspended in 1500 parts of water and 350 parts of concentrated hydrochloric acid and diazotized at 0–5° C. with a solution of 70 parts of sodium nitrite in 1000 parts of water. The acidity of the diazo solution is reduced with 200 parts of concentrated sodium carbonate solution, the whole is filtered and slowly introduced at 70–75° C. into a solution of 200 parts of potassium xanthogenate in 1000 parts of water. The solution is constantly kept feebly alkaline by addition of small quantities of sodium carbonate.

The viscid xanthic acid ester which has precipitated is saponified by boiling for several hours with 1500 parts of alcohol and 200 parts of caustic potash. After distilling the solvent, the residue is taken up in 1000 parts of water and condensed at 60–80° C. with an aqueous solution of 100 parts of chloroacetic acid rendered feebly alkaline with sodium carbonate. The potassium salt of the thioglycolic acid is precipitated for the greatest part. This salt is converted into the free 5:8-dichloro-naphthalene-1-thioglycolic acid by acidifying with concentrated hydrochloric acid and stirring for several hours. After recrystallization from benzene, this acid forms colorless needles of melting point 131–131.5° C.

287 parts of 5:8-dichloro-naphthalene-1-thioglycolic acid are heated with 140 parts of phosphorus trichloride and 500 parts of tetrachloroethane for 2 hours to 90–95° C. The solution of the acid chloride is decanted from the sediment and dropped at 40° C. into a suspension of 150 parts of aluminium chloride in 800 parts of tetrachloroethane. After stirring for a short time, the solution is poured onto ice and the solvent is distilled with steam in a vacuum. The lemon colored indoxyl is filtered and washed until free from acid. For the purpose of purification it is dissolved in caustic soda solution of 5 percent strength with addition of alcohol, and reprecipitated after filtering by addition of acid. When recrystallized from glacial acetic acid or benzene it forms small yellow needles of melting point 183–184° C. (with decomposition).

After recrystallization from chlorobenzene, the paradimethylamino-anil forms solid violet crystals of melting point 255° C. having an intensive surface lustre.

*Example 2*

269 parts of 3-hydroxy-6:9-dichloronaphtho-[1.2—b] thiophene (Ring Index No. 1744) formerly called 5:8-dichloro-1:2-naphththioindoxyl and 331 parts of 2-(4'-dimethylamino)-anil of 4-methyl-6-chlorothionaphthenequinone are heated for several hours in the boiling water-bath with 5000 parts of glacial acetic acid. After cooling, the dyestuff is suction-filtered, washed with alcohol and dried. It forms a red-brown powder of the formula

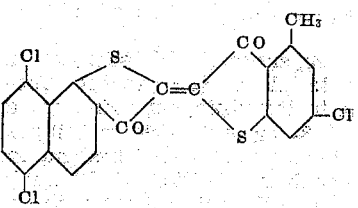

which dissolves in sulfuric acid with a blue-green coloration and dyes cotton from a yellow-brown vat bordeaux tints.

A dyestuff having similar properties is obtained by replacing in this example the 4-methyl-6- chloro-thionaphthenequinone-2-(4'-dimethylamino)-anil by the 2-(4'-dimethylamino)-anil of 5-methyl-6-chloro-thionaphthenequinone.

Example 3

269 parts of 3-hydroxy-6:9-dichloro-naphtho-[1.2—b] thiophene (Ring Index No. 1744) formerly called 5:8-dichloro-1:2-naphthioindoxyl and 367 parts of 2-(4'-dimethylamino)-anil of 2:3-diketo-2: 3-dihydro-9-chloro-thiophanthrene (Ring Index No. 1742) are heated with 5000 parts of glacial acetic acid for several hours in the boiling water-bath. After cooling the dyestuff is suction-filtered, washed with alcohol and dried. It forms an indigo blue powder of the formula

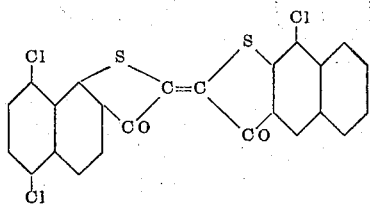

which dissolves in concentrated sulfuric acid with a green coloration and dyes cotton from a brown vat reddish-grey tints.

Example 4

269 parts of 3-hydroxy-6:9-dichloronaphtho-[1.2—b] thiophene (Ring Index No. 1744) formerly called 5:8-dichloro-1:2-naphththioindoxyl and 326 parts of 2-(4'-dimethylamino)-anil of 6-ethoxythionaphthenequinone are heated with 5000 parts of glacial acetic acid for several hours in the boiling water-bath. After cooling, the dyestuff is suction-filtered, washed with alcohol and dried. It forms a red-brown powder of the

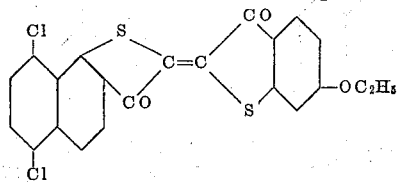

formula which dissolves in concentrated sulfuric acid with a pure blue coloration and dyes cotton from a brown vat reddish-brown tints.

A dyestuff having similar properties is obtained by replacing in this example the 2-(4'-dimethylamino)-anil of the 6-ethoxy-thionaphthenequinone by 182 parts of acenaphthenequinone.

Example 5

305 parts of 5:7-dibromoisatin are converted into the α-chloride by heating for 1 hour at 110–120° C. with 260 parts of phosphorus pentachloride and 6000 parts of chlorobenzene. The solution of the chloride is coupled with the solution of 269 parts of 3-hydroxy-6:9-dichloro-naphtho-[1.2—b] thiophene (Ring Index No. 1744) formerly called 5:8-dichloro-1:2-naphthioindoxyl in 1000 parts of chlorobenzene at 70° C. After cooling, the dyestuff is suction-filtered, washed with alcohol and dried. It forms a blue powder of the formula

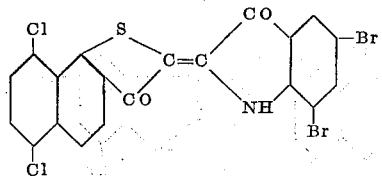

having a violet tinge which dissolves in concentrated sulfuric acid with a blue coloration and dyes cotton from a yellow vat reddish blue tints.

Dyestuffs with similar properties are obtained by replacing in this example the 5:7-dibromoisatin by 226 parts of 5-bromo-isatin or by 225 parts of 4-methyl-5-chloro-7-methoxyisatin.

Example 6

269 parts of 3-hydroxy-6:9-dichloronaphtho-[1.2—b] thiophene (Ring Index No. 1744) formerly called 5:8-dichloro-1:2-naphththioindoxyl and 305 parts of 5:7-dibromoisatin are heated for several hours in the boiling water-bath with 5000 parts of glacial acetic acid and 10 parts of concentrated hydrochloric acid. After cooling, the dyestuff is suction-filtered, washed with alcohol and dried. It forms a brown-violet powder of the formula

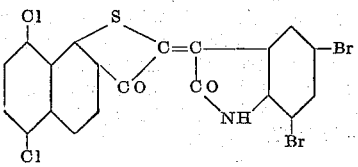

which dissolves in concentrated sulfuric acid with a violet-red coloration and dyes cotton from a green-yellow vat blackish-brown tints which become redder on soaping.

The appended claim is directed to the dyestuff of the present example.

Example 7

269 parts of 3-hydroxy-6:9-dichloronaphtho-[1.2—b] thiophene (Ring Index No. 1744) formerly called 5:8-dichloro-1:2-naphththioindoxyl and 185 parts of 6-chloro-7-methylisatin are heated for several hours in the boiling water-bath with 4000 parts of glacial acetic acid and 10 parts of concentrated hydrochloric acid. After cooling, the dyestuff is suction-filtered, washed with alcohol and dried. It is a bordeaux powder of the formula

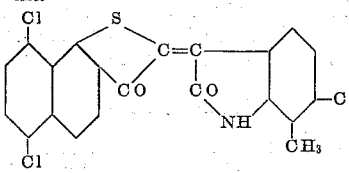

which dissolves in concentrated sulfuric acid with a blue coloration and dyes cotton from a yellow brown vat red-brown tints.

A dyestuff having similar properties is obtained by replacing in this example the 6-chloro-7-methyl-isatin by 226 parts of 5-bromoisatin.

Example 8

269 parts of 1-hydroxy-6:9-dichloronaphtho-[2.1—b] thiophene (Ring Index No. 1745) formerly called 5:8-dichloro-2:1-naphththioindoxyl and 282 parts of 2-(4'-dimethylamino)-anil of thionaphthenequinone are heated for several hours in the boiling water-bath with 5000 parts of glacial acetic acid. After cooling, the dyestuff is suction-filtered, washed with alcohol and dried. It is a red-brown powder of the formula

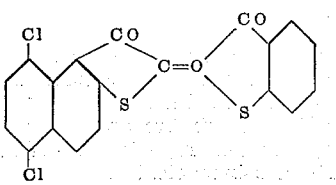

which dissolves in concentrated sulfuric acid with a green-blue coloration and dyes cotton from an orange-brown vat red-brown tints.

The 1-hydroxy-6:9-dichloronaphtho[2.1—b]thiophene used in the present example can be obtained in the following manner:

5:8-dichloro-β-naphthylamine is converted into the 5:8-dichloronaphthalene-2-thioglycolic acid with aid of the known xanthogenate method. After recrystallization from benzene or chloroform, this acid forms laminae having a silver lustre of melting point 136–137° C. By treating this acid with phosphorus trichloride in chlorobenzene it is converted into the acid choride and ring closure to 5:8-dichloro-2:1-naphththioindoxyl is subsequently brought about with aluminum chloride. After recrystallization from glacial acetic acid this forms yellowish prisms having a violet surface lustre, of melting point 186° C.

After recrystallization from chlorobenzene, the paradimethylamino-anil obtainable from this naphththioindoxyl in known manner forms violet tinged laminae having a copper lustre, of melting point 247–248° C.

Example 9

269 parts of 1-hydroxy-6:9-dichloronaphtho-[2.1—b] thiophene (Ring Index No. 1745) formerly called 5:8-dichloro-2:1-naphththioindoxyl and 182 parts of acenaphthenequinone are heated for several hours in a boiling water-bath with 15,000 parts of glacial acetic acid and 100 parts of concentrated hydrochloric acid. After cooling, the dyestuff of the formula

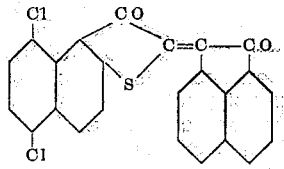

is suction-filtered, washed with alcohol and dried. It forms orange laminae which dissolve in concentrated sulfuric acid with a blue coloration and dye cotton from an olive-brown vat yellow orange tints.

Example 10

305 parts of 5:7-dibromoisatin are converted into the α-chloride by heating for 1 hour to 110–120° C. with 260 parts of phosphorus pentachloride and 6000 parts of chlorobenzene. The solution of the α-chloride is coupled at 70° C. with the solution of 269 parts of 1-hydroxy-6:9-dichloronaphtho-[2.1—b] thiophene (Ring Index No. 1745) formerly called 5:8-dichloro-2:1-naphththioindoxyl in 10,000 parts of chlorobenzene. After cooling, the dyestuff is suction-filtered, washed with alcohol and dried. It forms a brown-violet powder of the formula

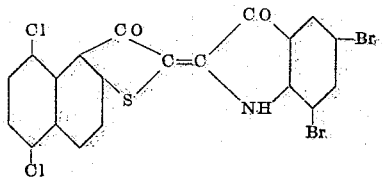

which dissolves in concentrated sulfuric acid with a blue coloration and dyes cotton from a red orange vat heliotrope tints.

A dyestuff having similar properties is obtained by replacing in this example the 5:7-dibromoisatin by 226 parts of 5-bromoisatin.

Example 11

269 parts of 1-hydroxy-6:9-dichloronaphtho-[2.1—b] thiophene (Ring Index No. 1745) formerly called 5:8-dichloro-2:1-naphththioindoxyl and 305 parts of 5:7-dibromoisatin are heated for several hours in a boiling water-bath with 10,000 parts of glacial acetic acid and 50 parts of concentrated hydrochloric acid. After cooling, the dyestuff is suction-filtered, washed with alcohol and dried. It forms a red powder of the formula

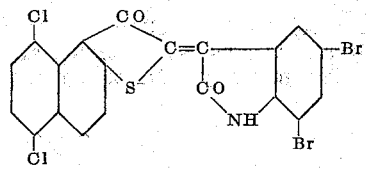

which dissolves in concentrated sulfuric acid with a red coloration and dyes cotton from a light yellow vat orange brown shades.

Example 12

269 parts of 1-hydroxy-5:9-dichloro-naphtho-[2.1—b] thiophene (Ring Index No. 1745) formerly called 4:8-dichloro-2:1-naphththioindoxyl and 366 parts of 2-(4'-dimethylamino)-anil of 2:3-diketo-2:3-dihydro-9-chlorothiophanthrene (Ring Index No. 1742) are heated for several hours in a boiling water-bath with 5000 parts of glacial acetic acid. After cooling, the dyestuff is suction-filtered, washed with alcohol and dried. It forms a violet powder of the formula

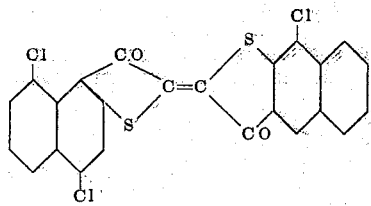

which dissolves in concentrated sulfuric acid with a grey-violet coloration and dyes cotton from a red vat heliotrope tints.

The 4:8-dichloro-2:1-naphththioindoxyl used in the present example can be obtained from 4:8-dichloro-2-naphthyl-amine by the known xanthogenate method. The 4:8-dichloronaphthalene-2-thioglycolic acid forms colorless laminae melting at 129–130° C. (from benzene). The 4:8-dichloro-2:1-naphththioindoxyl represents light brown crystals of melting point 190–192° C. (from dioxane).

Example 13

269 parts of 1-hydroxy-5:9-dichloro-naphtho-[2.1—b] thiophene (Ring Index No. 1745) formerly called 4:8-dichloro-2:1-naphththioindoxyl and 305 parts of 5:7-dibromoisatin are heated for several hours in a boiling water-bath with 5000 parts of glacial acetic acid and 10 parts of concentrated hydrochloric acid. After cooling, the dyestuff is suction-filtered, washed with alcohol and dried. It forms a light brown powder of the formula

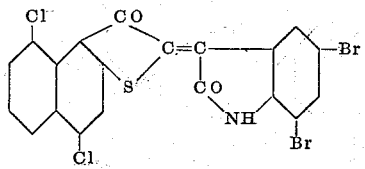

which dissolves in concentrated sulfuric acid with a blue-violet coloration and dyes cotton from a yellow-orange vat yellow-brown tints.

Example 14

358 parts of 1-hydroxy-6:9-dibromo-naphtho-[2.1—b] thiophene (Ring Index No. 1745) formerly called 5:8-dibromo-2:1-naphththioindoxyl and 331 parts of 2-(4'-dimethylamino)-anil of 4-methyl-6-chloro-thionaphthenequinone are heated for several hours in a boiling water-bath with 5000 parts of glacial acetic acid. After cooling, the dyestuff is suction-filtered, washed with alcohol and dried. It forms a brown-violet powder of the formula

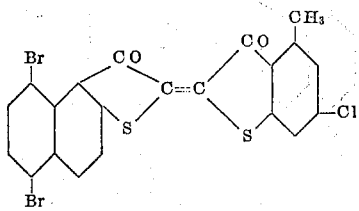

which dissolves in concentrated sulfuric acid with a greenish blue coloration and dyes cotton from a red vat red tints.

The 1-hydroxy-6:9-dibromonaphtho-[2.1—b] thiophene used in the present example can be obtained as follows:

5:8-dibromonaphthalene-2-sulfonic acid is converted into the acid chloride with phosphorus pentachloride, and this is reduced in known manner to the corresponding mercaptan. By condensation with chloroacetic acid there is obtained the 5:8-dibromonaphthalene-2-thioglycolic acid. It forms colorless laminae of melting point 145-145.5° C. (from chloroform). Ring closure with aluminum chloride in chlorobenzene via the acid chloride leads to the 5:8-dibromo-2:1-naphththioindoxyl. This forms light brown crystals melting at 209-210° C. (from dioxane).

Example 15

358 parts of 1-hydroxy-6:9-dibromo-naphtho-[2.1—b] thiophene (Ring Index No. 1745) formerly called 5:8-dibromo-2:1-naphththioindoxyl and 305 parts of 5:7-dibromoisatin are heated for several hours in a boiling water-bath with 10,000 parts of glacial acetic acid and 50 parts of concentrated hydrochloric acid. After cooling, the dyestuff is suction-filtered, washed with alcohol and dried. It forms a red-brown powder of the formula

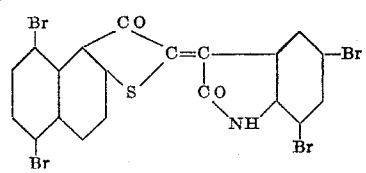

which dissolves in concentrated sulfuric acid with a blue-violet coloration and dyes cotton from an orange-red vat yellowish-brown tints.

Example 16

226 parts of 4-methyl-5-chloro-7-methoxy-isatin are converted into the α-chloride by heating with 260 parts of phosphorus pentachloride and 6000 parts of chlorobenzene for 1 hour to 110-120° C. The solution of the α-chloride is coupled with the solution of 314 parts of 3-hydroxy-6-chloro-9-bromothiophanthrene (Ring Index No. 1742) formerly called 1-bromo-6-chloro-2:3-naphththioindoxyl in 10,000 parts of chlorobenzene at 70° C. After cooling, the dyestuff is suction-filtered, washed with alcohol and dried. It forms a violet-tinged blue powder of the formula

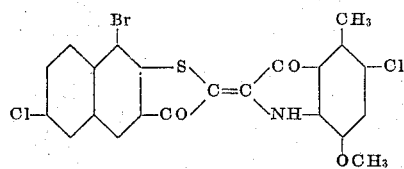

which dissolves in concentrated sulfuric acid with a green coloration and dyes cotton from an orange vat blue tints.

The 3-hydroxy-6-chloro-9-bromo-thiophanthrene used in the present example can be obtained as follows:

6-chloro-naphthalene-2-thioglycolic acid is treated in carbon tetrachloride at 55-60° C. and in the presence of anhydrous ferric chloride with 2 atoms of bromine and converted into the 1-bromo-6-chloronaphthalene-2-thioglycolic acid. After recrystallization from benzene and acetone this forms colorless needles of melting point 164-165° C. and the ring can be closed to form the 1-bromo-6-chloro-2:3-naphththioindoxyl by conversion into the acid chloride with phosphorus trichloride in chlorobenzene and treatment with aluminum chloride. This compound forms a green-yellow powder which dissolves in glacial acetic acid and benzene.

Example 17

314 parts of 3-hydroxy-6-chloro-9-bromothiophanthrene (Ring Index No. 1742) formerly called 1-bromo-6-chloro-2:3-naphththioindoxyl and 282 parts of 2-(4'-dimethylamino-anil of thionaphthenequinone are heated for several hours in a boiling water-bath with 5000 parts of glacial acetic acid. After cooling, the dyestuff is suction-filtered, washed with alcohol and dried. It forms a bordeaux red powder of the formula

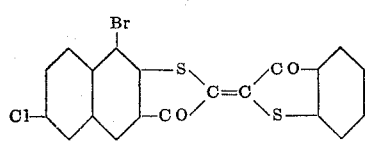

which dissolves in concentrated sulfuric acid with a grey-violet coloration and dyes cotton from an orange vat bordeaux red tints.

Example 18

401 parts of α-(4'-dimethylamino)-anil of 3-hydroxy-6:9-dichloronaphtho-[1.2—b] thiophene (Ring Index No. 1744) formerly called 5:8-dichloro-1:2-naphththioisatin and 200 parts of 1:2-naphththioindoxyl are heated for several hours in a boiling water-bath with 10,000 parts of glacial acetic acid. After cooling, the dyestuff is suction-filtered, washed with alcohol and dried. It forms a black-violet powder of the formula

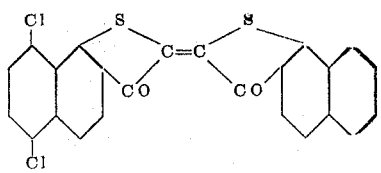

which dissolves in concentrated sulfuric acid with a violet coloration and dyes cotton from an orange vat grey tints.

Example 19

398 parts of the dyestuff from 3-hydroxy-6:9-dichloronaphtho-[1.2—b] thiophene (Ring Index No. 1744) formerly called 5:8-dichloro-1:2-naphththioindoxyl and α-isatin chloride are introduced into 6000 parts of nitrobenzene and mixed with 176 parts of bromine. The reaction mass is left to stand for 24 hours and is then gradually heated to 120° C. during 20 hours. After cooling, the whole is filtered and the filter residue thoroughly washed with alcohol and dried. The dyestuff obtained is practically identical with that obtained according to Example 5, second paragraph (from 5-bromo-isatin chloride).

Example 20

148 parts of isatin are introduced at room temperature into a mixture of 1143 parts of monohydrate, 290 parts of ice and 330 parts of bromine, while well stirring. The mixture is then heated to 40° C. within 1 hour and stirred at this temperature for 16 hours, whereupon the temperature is gradually raised to 60° C. within 9 hours. During cooling, the excess of bromine and hydrogen bromide is expelled by bubbling air through the solution. The suspension is then diluted with 900 parts of monohydrate and mixed with 269 parts of 5:8-dichloro-1:2-naphththioindoxyl. The whole is heated to 80° C. and kept at this temperature for 4 hours. After cooling, the suspension is introduced into ice-water, the precipitated dyestuff is filtered off and washed until free from acid. It can be made into pastes in the moist state or dried immediately.

The dyestuff obtained is practically identical with that obtained according to Example 6.

Example 21

1 part of the dyestuff obtained according to Example 6 is made into a paste with 200 parts of water and, after addition of 4 parts of caustic soda solution of 36° Bé., vatted with 2 parts of sodium hydrosulfite at about 60° C. This stock vat is added to a dyebath of 3800 parts of water which has been sharpened with 1 part of caustic soda solution of 36° Bé. and 1 part of sodium hydrosulfite. 100 parts of cotton are introduced into this bath at 40° C. and dyeing is conducted for 1 hour at 40–60° C. The material is then squeezed off, oxidized, rinsed, acidified, rinsed again and soaped at the boil. The cotton is dyed fast blackish brown shades.

The dyestuff is also excellently suitable for printing according to the usual potash printing process.

What we claim is:

The indigoid dyestuff of the formula

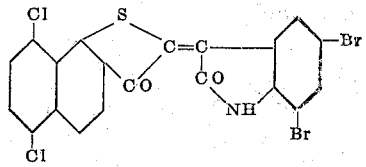

KURT HOELZLE.
EDUARD KAMBLI.

REFERENCES CITED

The following references are of record in the file of this patent:

UNITED STATES PATENTS

| Number | Name | Date |
|---|---|---|
| 1,709,977 | Haller | Apr. 23, 1929 |
| 1,712,721 | Thiess et al. | May 14, 1929 |
| 1,728,987 | Thiess et al. | Sept. 24, 1929 |
| 1,730,699 | Wagner et al. | Oct. 8, 1929 |
| 2,096,141 | Stoecklin et al. | Oct. 19, 1937 |

FOREIGN PATENTS

| Number | Country | Date |
|---|---|---|
| 436,322 | Great Britain | Oct. 9, 1935 |

OTHER REFERENCES

Patterson et al., "The Ring Index," Reinhold Pub. Co., New York (1940), pages 237 and 238.

Certificate of Correction

Patent No. 2,453,225.  November 9, 1948.

KURT HOELZLE ET AL.

It is hereby certified that errors appear in the printed specification of the above numbered patent requiring correction as follows:

Column 5, line 47, Example 4, strike out the word "formula" and insert the same after "powder of the", line 38, same column; column 6, Example 7, in the formula, extreme right hand portion thereof, for "—C" read —$Cl$; column 10, line 39, Example 17, after "dimethylamino" and before the hyphen insert a closing parenthesis;

and that the said Letters Patent should be read with these corrections therein that the same may conform to the record of the case in the Patent Office.

Signed and sealed this 22nd day of March, A. D. 1949.

[SEAL]

THOMAS F. MURPHY,
*Assistant Commissioner of Patents.*